Jan. 5, 1954 R. E. EVANS ET AL 2,665,031
MATERIAL WEIGHING AND DELIVERING APPARATUS
Filed Jan. 6, 1951 2 Sheets-Sheet 1

INVENTORS
R. E. EVANS
P. F. DARBY
T. G. OWEN
BY
John H. Lewis Jr.
ATTORNEYS

Jan. 5, 1954  R. E. EVANS ET AL  2,665,031
MATERIAL WEIGHING AND DELIVERING APPARATUS
Filed Jan. 6, 1951  2 Sheets-Sheet 2

INVENTORS
R. E. EVANS
P. F. DARBY
T. G. OWEN
BY
ATTORNEYS

Patented Jan. 5, 1954

2,665,031

UNITED STATES PATENT OFFICE 2,665,031

MATERIAL WEIGHING AND DELIVERING APPARATUS

Richard E. Evans, Southport, Paul F. Darby and Thomas G. Owen, Fairfield, Conn., assignors, by mesne assignments, to Rem-Cru Titanium, Inc., Midland, Pa., a corporation of Pennsylvania Application January 6, 1951, Serial No. 204,810

3 Claims. (Cl. 222—57)

This invention relates to means for securing the delivery of a plurality of materials in desired proportions, the particular embodiment of the invention to be described being designed for the purpose of effecting proportioned delivery of titanium sponge and an alloying ingredient to a melting furnace. The gravimetric density, granulation, and other rheological characteristics of the ingredients are such that it is impracticable to prepare a homogeneous mixture in the desired proportions in a granular, comminuted, or pulverulent form. A constant delivery of the correct proportions is essential when any substantial mixing in the molten state is difficult.

The present invention contemplates providing separate containers for the materials to be delivered, such as one container for titanium sponge and a second container for an alloying ingredient, balancing the two containers and associated parts on a scale beam during delivery of the materials, and regulating the delivery of one of the materials according to the departure of the scale beam from balance; that is, the contents of each container are constantly weighed, and a correction is made in the rate of delivery of material from one of the containers in accordance with any deviation from standard proportions in the weights of material remaining in the containers. The delivery means is preferably of a mechanical character, such as feed screws, and the rate of rotation of one of the feed screws is controlled by a servo-motor which in turn is controlled by the departure from balance of the scale beam.

In the drawings:

Fig. 1a is a fragmentary view, partly in section and with parts broken away, of a hopper employed with the apparatus shown in Fig. 1.

Fig. 1b is also a fragmentary showing of means for supporting the hopper of Fig. 1a upon the apparatus of Fig. 1.

Fig. 1c is a fragmentary showing, partly in section and with parts broken away, of the bottom portion of the hopper shown in Fig. 1a, together with means for feeding material therefrom.

Fig. 1d is a further fragmentary showing, also partly in section and with parts broken away, of a second hopper, and outfeed means therefor, employed with the apparatus of Fig. 1, and also showing the means for associating a discharge tube of such hopper with a melting furnace.

Figure 1:
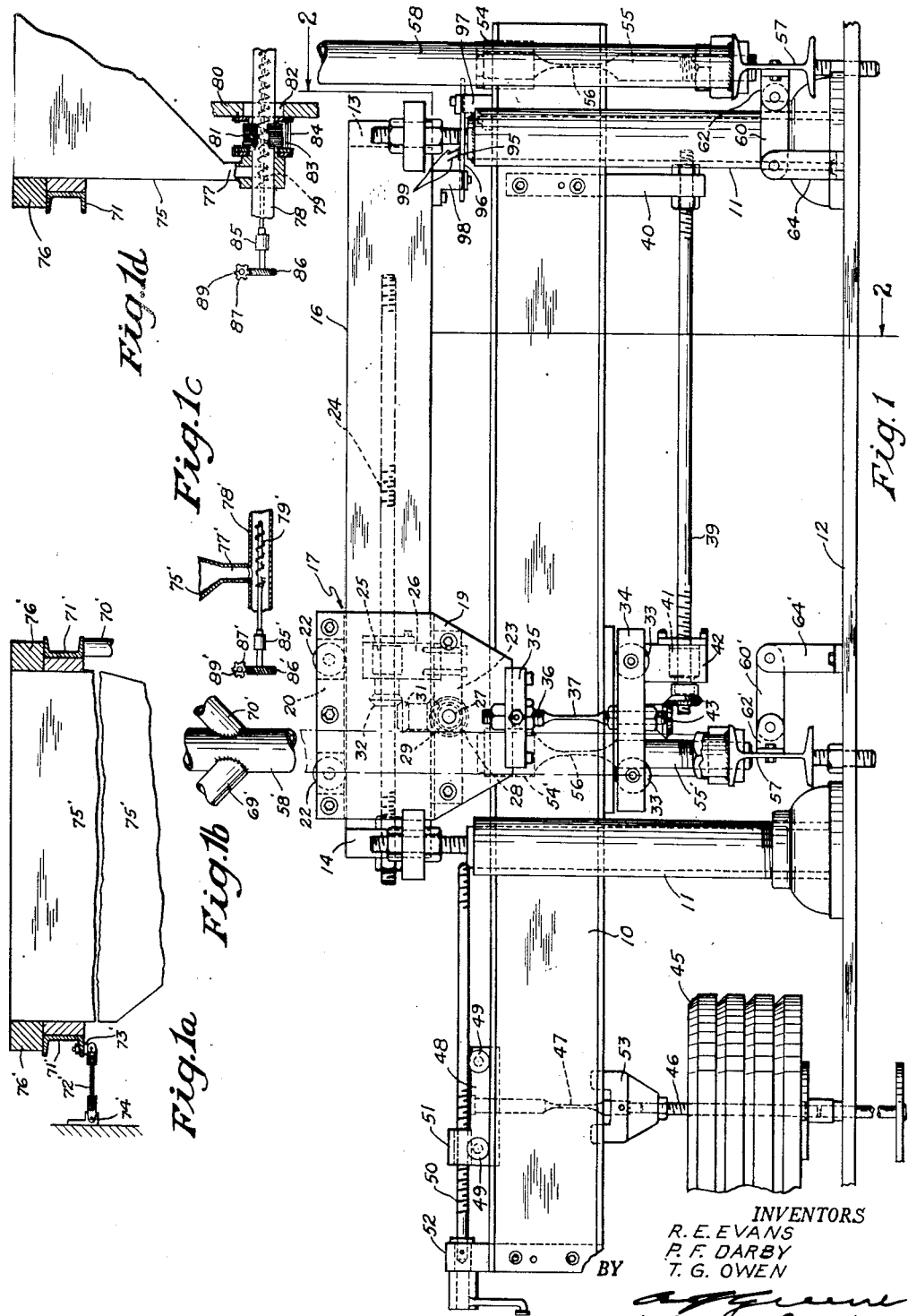
Fig. 1 is a fragmentary elevation, some parts of which are in section and some merely diagrammatically represented.

The hoppers and associated parts are supported from a pivoted weighing scale beam 10, which beam is hung from a fixed frame comprising four posts 11 extending upwardly from a base 12 and arranged in pairs, the posts of each pair being joined by cross bars 13 and 14, which bars are in turn joined by a pair of rails 15 and 16 which extend parallel to and above the scale beam 10. The hoppers are supported at points which are fixed lengthwise of the scale beam, but the proportions of materials delivered should be susceptible to variation to any desired extent, say from a ratio of 1:1 to a ratio of 100:1, the scale beam remaining in balance during any such delivery. To this end, the scale beam pivot point is capable of such adjustment that the distances from said pivot to the hopper support points respectively can be made inversely proportional to any desired delivery ratio. In the illustrative devices for this purpose shown in the drawings, the scale beam 10 is supported from the rails 15—16 by means of a carriage identified generally by the numeral 17. Said carriage comprises side plates 18 and 19 joined at their upper ends by a top plate 20 in which there are supported rollers 21 and 22 which ride on the upper surfaces of rails 15—16. Side plates 18 and 19 extend downwardly adjacent the outer faces of rails 15—16 and below said rails are joined by a plate 23 which forms a support for a carriage traversing mechanism comprising a screw 24 secured at one end in cross bar 14 and received in a threaded member 25 held in a support 26 secured to the carriage plate 23.

Member 25 is arranged for manual rotation through a suitable crank applied to a stub shaft 27 which is supported in the carriage side plate 19 and has secured thereto a bevel pinion 28 meshing with a bevel pinion 29 secured to a stub shaft 30, which stub shaft also carries a bevel pinion 31 meshing with a bevel pinion 32 associated with member 25.

The scale beam 10 is carried on rollers 33 pivoted in a plate 34 which is joined to the carriage side plates 18 and 19 through brackets 35 and adjustable connector members 36. The connector members, one of which is placed on each side of the scale beam, are designed to provide flexing sections 37 which, while of adequate tensile strength, are sufficiently flexible to provide for the desired tilting movement of the scale beam. In the particular embodiment shown in the drawings, each of the connectors 36 is comprised of a single piece, the end portions of which have a circular cross-section while the midportion 37 is reduced to a blade-like section. Any other desired flexing support may be provided.

It will be understood that the lower plate 34 is traversed with and forms a part of carriage 17 except that it is tiltable with respect to the upper portion of said carriage by the pivotal movement of the scale beam. To provide for traversing plate 34 in unison with the upper portion of the carriage, a screw 39 secured to an arm 40 depending from the scale beam is received in an interiorly threaded boss 41 carried in a bracket 42 depending from plate 34. Screw 39 has a bevel gear connection with a stub shaft 43 held in plate 34 and rotated by a flexible shaft connection with the stub shaft 30, the lower connector of the flexible shaft being shown at 44.

To provide for the preliminary balancing of the scale beam, as different initial loads are applied thereto, a variable weight 45 carried on a holder 46 comprising a flexing section 47 is hung from a carriage 48 supported on the scale beam 10 through rollers 49 and traversed by means of a screw 50 received in a threaded member 51 associated with carriage 48 and rotatably mounted in a bracket 52 secured to the scale beam. It will be noted that the scale beam 10 is comprised of two similar spaced channels which are secured together by suitable means, such as the arm 40 and the screw supporting bracket 52. Extending between these channels is a guide member 53 for the weight support 46.

Figure 2:
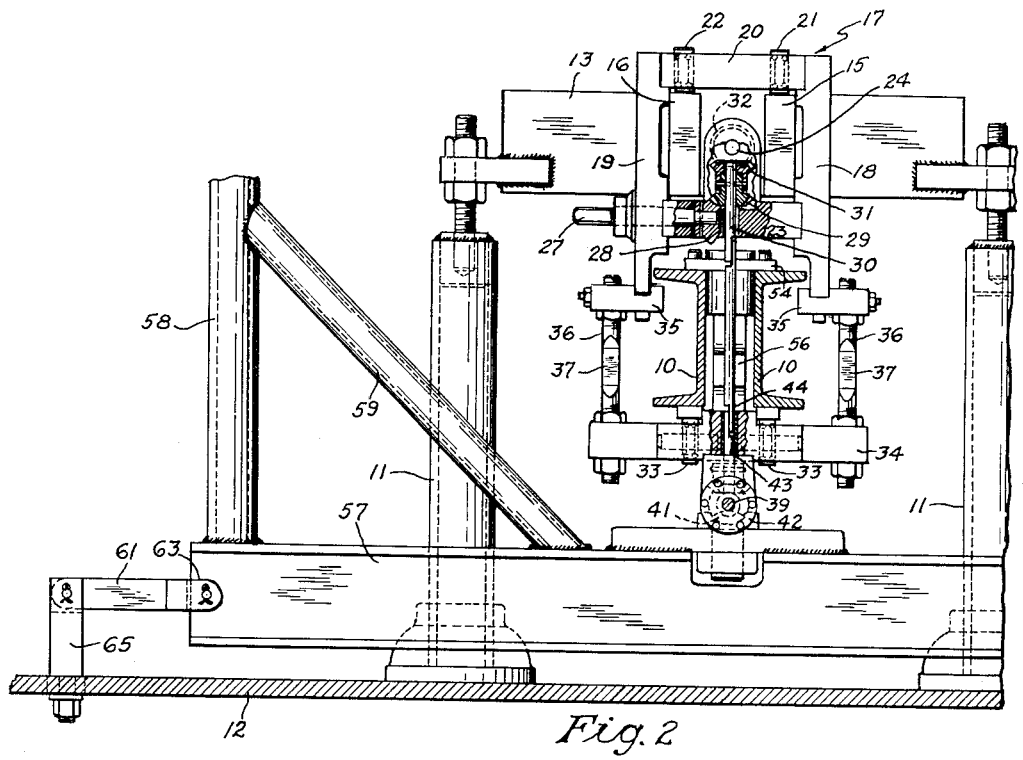
Fig. 2 is a section on line 2—2 of Fig. 1.

The two hoppers, from which comminuted material is to be delivered, and the delivery mechanism associated with each hopper are supported upon the scale beam 10 at appropriate points in the length of said scale beam. A fragment of the smaller or alloy hopper, with its support and material delivery devices, is shown in Fig. 1d adjacent the right end of Fig. 1 (see also Fig. 2), and corresponding parts associated with the larger sponge hopper are shown in Fig. 1a toward the left in Fig. 1. The two hoppers and associated parts being substantially similar, a description of one of them, usually the alloy hopper, will suffice. Like numerals with a "prime" (') addition have been used for the sponge hopper devices.

To a hollow flanged boss 54 attached to the scale beam is secured the upper end of a support member 55 which, like the supporting members 36, comprises a thin flexing section 56. The lower end of support 55 is secured to a cross-member such as I-beam 57. Adjacent the ends of beam 57 are secured upstanding posts 58 which are preferably of tubular construction. For greater rigidity, diagonally disposed brace members, one of which is shown at 59, may further join beam 57 and tubular posts 58. Guide links 60 and 61 pivoted in coupling plates 62 and 63 secured adjacent the ends of beam 57 substantially prevent transverse and longitudinal movement of beam 57 and associated parts. Links 60 and 61 are pivotally joined to posts 64 and 65 carried by fixed parts of the machine frame or base. The pivotal connections of said links 60 and 61 are provided with ball bearings or equivalent anti-friction devices, so that they offer a minimum of resistance to the movement of the scale beam.

Branch supports, fragments of which are shown at 69' and 70', preferably also tubular, are secured to the tubular posts 58 and 58' at appropriate points in their length, and the upper ends of members 58', 69' and 70' are secured to a hopper supporting ring 71' which may be conveniently made from channel stock. Lateral movement of hopper supporting ring 71' is prevented by suitable means, such as flexible stranded wires, one of which is shown at 72', said wires being joined to brackets 73' and 74' secured respectively to the hopper ring and to fixed parts on the machine frame.

Each of the hopper supporting rings receives the upper portion of a hopper 75, a convenient means of supporting a hopper 75 and its ring 71 comprising a bead or flange 76 secured to the top of the hopper. Material is delivered from each hopper through a hopper spout or throat 77 to a horizontally disposed tube 78 which contains a conveyor screw 79. Each delivery tube 78 extends through a fixed wall 80 which may be associated with a melting furnace or feed box therefor. The hoppers, delivery passages and space beyond wall 80 form part of a closed controlled atmosphere system. Since each tube 78 is supported from its hopper, which in turn is supported from the tilting scale beam, the connection between tube 78 and fixed wall 80 must be a flexible one. Such a connection may comprise a bellows 81, one end flange of which is secured to wall 80, while the opposite end flange is secured to tube 78. There being adequate clearance within the bellows between tube 78 and the margins of an aperture 82 in wall 80 through which said tube extends.

In the operation of the equipment there is at different times substantial variation in the fluid pressure within the closed furnace and the material delivery system. To guard against overmovement of bellows 81 under such varying pressure, suitable support means are provided between the two flanges of the bellows. Such means may comprise thrust rods 83 having conical ends which take into conical depressions in said flanges and flexible wires 84 secured in said flanges respectively. In view of the rounded or conical ends of the thrust rods 83 which fit in the aforementioned corresponding recesses, and in view of the flexible wires 84 which are secured to the flanges of the bellows, preferably in the neighborhood of the rods 83, such flanges are capable of shifting in substantially parallel planes a sufficient amount to accommodate the weighing movement of the weighing system. Wide variations in pressure thus will not cause excessive expansion and contraction of the bellows 81 and will permit such movement only within the limits allowed by the aforementioned rods 83 and wires 84. That is, the flanges of the bellows are capable of moving toward one another only to the extent permitted by the rods 84, and conversely such flanges can move away from one another only to the extent permitted by the wires 84. Such movement is restricted to a very small amount thereby avoiding the exertion of undesired forces upon a hopper, as at 75. It will be understood that the movement of the scale beam and associated parts is only a few thousandths of an inch, thus such connecting parts as links 60, 61 and 72, bellows 81, and universal joints 89 (to be described), do not offer an appreciable resistance to the desired scale beam movement.

Figure 3:
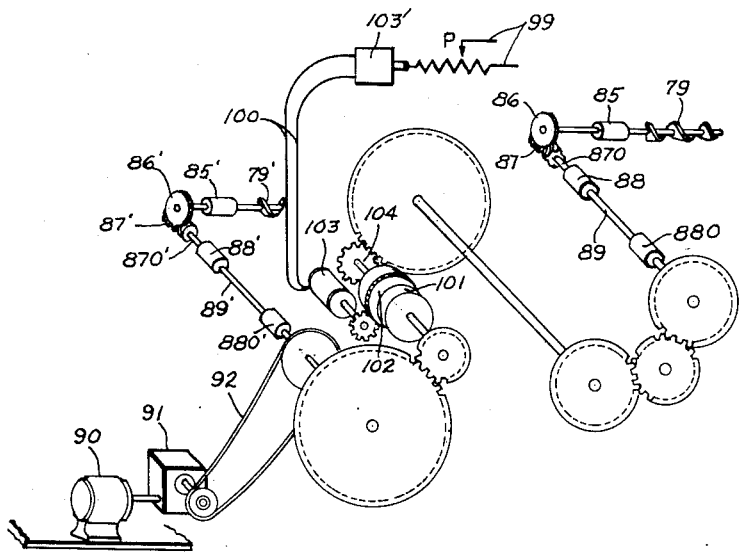
Fig. 3 is a diagrammatic representation of the mechanism by which the feed screws are driven and one such feed screw is controlled by the deflection of the scale beam.

Each of the conveyor screws 79 is driven through a universal joint 85 from a stub shaft which carries a worm gear 86 driven by a worm pinion 87 carried on a stub shaft 870 which is connected through universal joint 88 with a drive shaft 89, driven through a second universal joint 880 from a suitable source of power, such as a motor 90 and gear box 91 (Fig. 3). The presence of the two universal joints 88 and 880 enables the free movement with the scale beam of stub shaft 870 and parts driven thereby. One of the feed screw drive shafts, preferably the shaft 89' associated with the ingredient delivered in the greater quantity, may be directly connected to gear box or variable speed drive 91 by suitable means, such as belt 92. The invention contemplates that the second feed screw drive shaft 89 be driven at a speed which is varied by the deflection of the scale beam. The system is balanced to provide for delivery of ingredients in certain proportions. Any variation from the desired proportions results in a deviation from standard of the relative weight of materials remaining in the hoppers and the delivery tubes, and such a variation deflects the scale beam 10. Means are provided whereby the displacement, velocity or acceleration of said beam controls the rate of delivery of one of the ingredients. In the present embodiment of the invention, this is accomplished by varying the rate of rotation of the feed screw 89 in response to the extent of departure of the scale beam from a balanced condition. The element responsive to the departure of the scale beam from balance is a strain gage 95 which is applied to a flexing element 96, one end of which is secured to the scale beam through post 97 while the opposite end is secured to the fixed rail 16 through bracket 98. One way of causing variations in the current in the strain gage circuit 99 to vary the movement of feed screw drive shaft 89, is to place in the driving train for said member 89, a differential gear device 101, and to rotate an appropriate element 102 of the differential gearing by means of a servo-motor 103, which is actuated from the current in circuit 99 through appropriate devices, preferably standard commercial instruments. The differential device 10 can be of conventional design having a normally stationary "spider" or frame element which when stationary permits rotation of the input and output shafts at a one-to-one ratio. The spider element, of course, can be rotated and the extent of such rotation is algebraically added or subtracted to the rotation of said output shaft, depending upon the direction of rotation of the spider element. For example, the variations in the current in circuit 99 may be applied to a measuring and self-balancing potentiometer P, and the deflection of the potentiometer transmitted to an electronic bi-directional motor control 103', the output of which is applied to the servo-motor through connecting wires 100. The servo-motor may rotate in either direction, according to the direction of deflection of scale beam 10, thus either accelerating or retarding the rotation of driven shaft 104 and feed screw drive shaft 89 with respect to their normal rate of rotation when the servo-motor is stationary. It will be noted that the motors and parts driven thereby, including the driven ends of shafts 89 and 89', are supported from fixed mounts, while the driven elements of universal joints 88 and 88' are supported indirectly from the scale beam. The shafts 89 and 89' being horizontally disposed and connected through the pairs of universal joints 88—880 and 88'—880', the resistance to deflection of the scale beam by the feed screw drive means is negligible.

What is claimed is:

1. Apparatus for the simultaneous and continuous delivery of materials from at least two separate hoppers in preselected gravimetric ratio comprising in combination: a scale beam having a fulcrum; means for adjusting the position of such fulcrum lengthwise of said scale beam; a pair of hoppers for such materials; means for operatively associating said hoppers with said scale beam on opposite sides of said fulcrum, the moment arms of said hoppers about said fulcrum bearing a ratio to one another in accordance with the adjustment of the position of said fulcrum; power means for effecting positive delivery from said hoppers each at a separate basic rate, such rates being at a ratio which is the inverse of the aforementioned ratio of said moment arms, said hoppers being initially charged with such material and said scale beam initially being in a balanced condition; an outfeed rate control means operatively connected to at least one of said positive delivery means for varying the basic delivery rate thereof; and means for governing said delivery rate control means in response to the extent of departure of said scale beam from a balanced position.

2. Apparatus for the simultaneous and continuous delivery of materials from at least two separate hoppers in preselected gravimetric ratio comprising in combination a scale beam having a fulcrum; means for adjusting the position of such fulcrum lengthwise of said scale beam; a pair of hoppers; means for operatively associating said hoppers with said scale beam on opposite sides of said fulcrum; means for effecting positive delivery from said hoppers each at a separate basic rate, such rates being at a ratio which is inversely proportional to the ratio of the moment arms of the respective hoppers about said fulcrum, said hoppers being initially charged with such material and said scale beam initially being in a balanced condition; balance control means operatively connected to at least one of said positive delivery means; means for varying the basic delivery rate thereof; and means for governing said balance control means in response to the extent of departure of said scale beam from a balanced position.

3. Apparatus for the simultaneous and continuous delivery of materials from at least two separate hoppers in preselected weight ratio comprising: a scale beam having a fulcrum; means for adjusting the position of such fulcrum lengthwise of said scale beam; a pair of hoppers; said hoppers being mounted on said scale beam on opposite sides of said fulcrum, the moment arms of said hoppers about said fulcrum bearing a ratio to one another in accordance with the adjustment of the position of said fulcrum; means having a common power source for effecting positive delivery from said hoppers each at a separate basic rate, such rates being at a ratio which is the inverse of the aforementioned ratio of the moment arms; control means operatively connected to at least one of said positive delivery means for varying the basic delivery rate thereof; and means for governing said control means in response to the extent of departure of said scale beam from a balanced position.

RICHARD E. EVANS.
PAUL F. DARBY.
THOMAS G. OWEN.

References Cited in the file of this patent

UNITED STATES PATENTS

| Number | Name | Date |
| --- | --- | --- |
| 299,757 | Du Brul | June 3, 1884 |
| 849,418 | Nickerson | Apr. 9, 1907 |
| 1,241,212 | Heisler | Sept. 25, 1917 |
| 1,536,589 | Keen | May 5, 1925 |
| 1,777,670 | Hausman | Oct. 7, 1930 |
| 1,861,443 | Holzapfel | June 7, 1932 |
| 2,213,982 | Frey | Sept. 10, 1940 |
| 2,273,330 | Robinson | Feb. 17, 1942 |
| 2,503,697 | Weckerly | Apr. 11, 1950 |
| 2,549,908 | Johansen | Apr. 24, 1951 |